Patented Sept. 22, 1925.

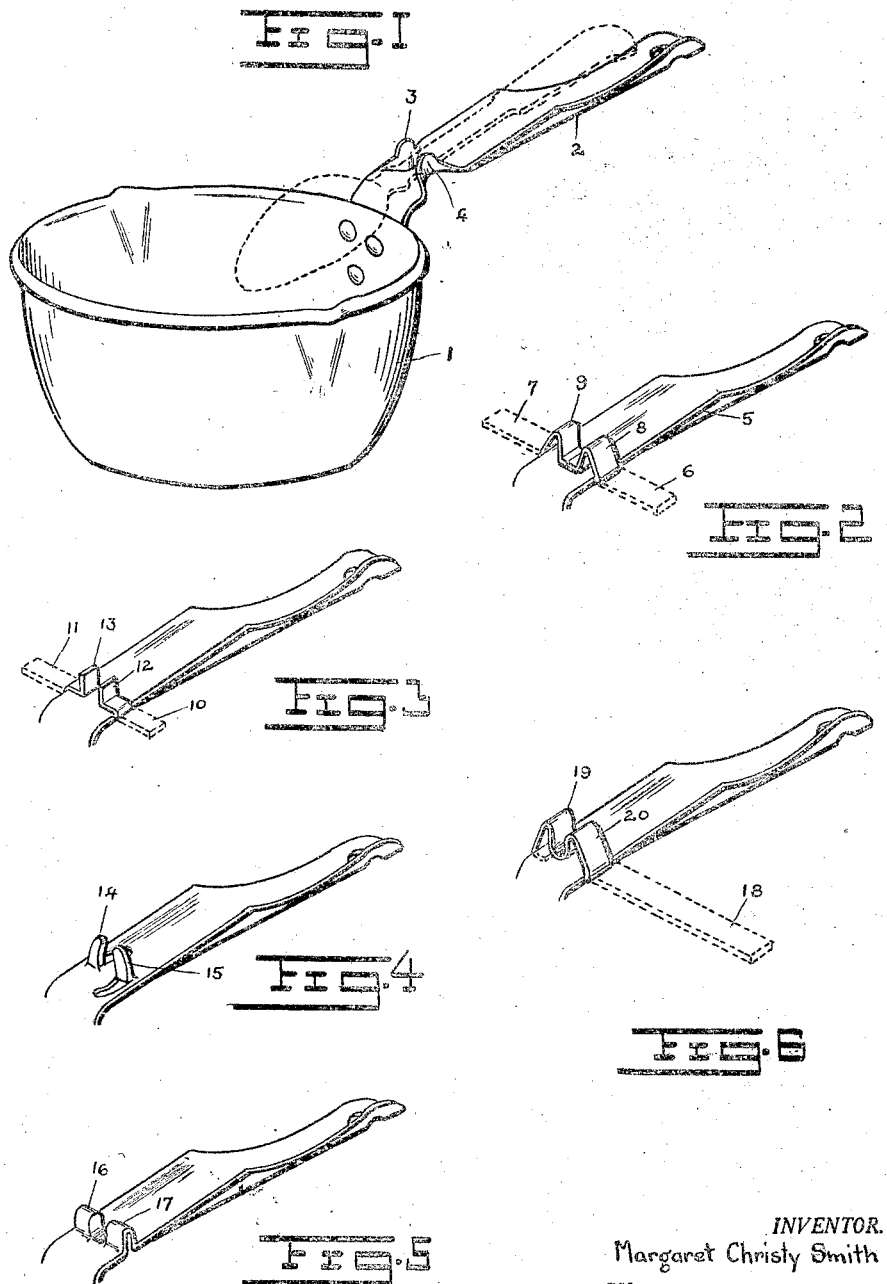

1,554,887

UNITED STATES PATENT OFFICE

MARGARET CHRISTY SMITH, OF NORTHAMPTON, MASSACHUSETTS.

SPOON HOLDER.

Application filed September 13, 1923. Serial No. 662,403.

*To all whom it may concern:*

Be it known that I, MARGARET CHRISTY SMITH, a citizen of the United States, residing at Northampton, in the county of Hampshire and State of Massachusetts, have invented certain new and useful Improvements in Spoon Holders, of which the following is a specification.

The object of this invention is to provide a spoon holder made integral with the handle of a pan in the manufacture thereof, said holder being arranged on the handle of the pan so that the handle of a spoon can engage therein and be held in place on the top of the handle of the pan, this being an improvement on the invention shown in the prior Patent 1,464,731 issued to F. L. Smith.

This and other objects of the invention will be illustrated in the drawing, described in the specification and pointed out in the claims at the end thereof.

In the drawings:

Figure 1 is a perspective view of the pan and its handle, the handle being specially formed to provide a holder thereon.

Figures 2, 3, 4, 5 and 6 are perspective views of the handle of a pan with the spoon holder formed thereon in various ways according to my invention.

In the drawings like reference numerals indicate like parts.

In the drawings reference numeral 1 indicates the pan having a handle 2 riveted thereto. As shown in Figure 1 the handle is drawn up on each edge to form ears 3 and 4 having a U shaped groove between them adapted to receive the narrow part of the spoon handle. These ears are so formed that they do not weaken or impair the strength or stiffness of the handle in any way whatever, nor do they require any extra metal in the blank from which the handle is formed.

In Figure 2 the handle 5 is provided with projections 6 and 7 which are shown by dotted lines and these are bent up to form the ears 8 and 9 which between them have a U shaped groove also adapted to hold the handle of the spoon. In this case the meeting edges of the projections are turned down and in and abut against each other while making contact with the handle of the pan.

In Figure 3 these same projections 10 and 11 are first turned in and then up to form the ears 12 and 13, between which a U shaped recess is formed adapted to receive the handle of the spoon.

In Figure 4 the ears 14 and 15 are cut from the metal of the handle from opposite directions and bent up the base of the lugs being in line with each other across the handle. In this way the handle is not materially weakened as it would be if the holes left by the cutting of the lugs were opposite to each other.

In Figure 5, I have shown the ears drawn up as indicated at 16 and 17.

In Figure 6, I have shown the handle formed with a single extension 18 bent to form the ears 19 and 20, having a U shaped recess between them.

I claim:

1. A pan having a handle having a concaved top forming a long and shallow channel, indentations on two opposite points in said handle to form ears opposite each other and integral with said handle and extending upwardly therefrom to narrow said long and shallow channel into a short, deep and narrow channel for a short distance, said short and deep channel and said long and shallow channel being adapted to hold a spoon handle parallel to the handle and radial to the pan.

2. A pan having a handle having a concaved top forming a shallow channel upwardly from the pan at an angle thereto, indentations on two opposite points in said handle to form ears opposite each other and integral with said handle and extending upwardly therefrom to narrow said long shallow channel into a short deep and narrow channel for a short distance, said short deep channel and said long shallow channel being adapted to hold a spoon handle parallel to said handle of said pan and at an angle to the pan.

In testimony whereof I affix my signature.

MARGARET CHRISTY SMITH.